United States Patent
Mutter et al.

(10) Patent No.: US 11,632,265 B2
(45) Date of Patent: Apr. 18, 2023

(54) TRANSCEIVER UNIT AND COMMUNICATION CONTROL UNIT FOR A USER STATION OF A SERIAL BUS SYSTEM AND METHOD FOR COMMUNICATION IN A SERIAL BUS SYSTEM

(71) Applicant: Robert Bosch GmbH, Stuttgart (DE)

(72) Inventors: Arthur Mutter, Neuhausen (DE); Florian Hartwich, Reutlingen (DE); Steffen Walker, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 20 days.

(21) Appl. No.: 17/610,915

(22) PCT Filed: May 5, 2020

(86) PCT No.: PCT/EP2020/062404
§ 371 (c)(1),
(2) Date: Nov. 12, 2021

(87) PCT Pub. No.: WO2020/229221
PCT Pub. Date: Nov. 19, 2020

(65) Prior Publication Data
US 2022/0217014 A1    Jul. 7, 2022

(30) Foreign Application Priority Data
May 16, 2019   (DE) ..................... 10 2019 207 174.0

(51) Int. Cl.
*H04L 12/40* (2006.01)
(52) U.S. Cl.
CPC .... *H04L 12/40169* (2013.01); *H04L 12/4013* (2013.01); *H04L 2012/40215* (2013.01)

(58) Field of Classification Search
CPC ........... H04L 12/40032; H04L 12/4013; H04L 12/40169; H04L 2012/40215
See application file for complete search history.

(56) References Cited

U.S. PATENT DOCUMENTS 6,360,277 B1 * 3/2002 Ruckley .............. H04L 41/0213
710/63
2005/0273210 A1 * 12/2005 Pfaffeneder ......... B60R 16/0315
701/1

(Continued)

FOREIGN PATENT DOCUMENTS

CN   101069153 A   11/2007
CN   101960789 A   1/2011

(Continued)

OTHER PUBLICATIONS

International Search Report for PCT/EP2020/062404 dated Jul. 28, 2020.

*Primary Examiner* — Stephen J Clawson
(74) *Attorney, Agent, or Firm* — Norton Rose Fulbright US LLP; Gerard Messina (57) ABSTRACT

A transceiver unit for a user station of a serial bus system. The transceiver unit has a first connection for receiving a transmit signal from a communication control unit, a transmitter for transmitting the transmit signal to a bus of the bus system, a receiver for receiving the signal from the bus, the receiver generating a digital receive signal from the signal received from the bus, a second connection for transmitting the digital receive signal to the communication control unit and for receiving an additional signal from the communication control unit, and an operating mode switching block for evaluating the receive signal output by the receiver and a signal received at the second connection by the communication control unit. The operating mode switching block switches the transmitter and/or the receiver into one of at (Continued)

least two different operating modes as a function of a result of the evaluation.

15 Claims, 5 Drawing Sheets

(56) References Cited

U.S. PATENT DOCUMENTS

| | | | |
|---|---|---|---|
| 2011/0082960 A1* | 4/2011 | Lee | G06F 13/4295 |
| | | | 710/305 |
| 2014/0280636 A1* | 9/2014 | Fredriksson | H04L 65/1101 |
| | | | 709/206 |
| 2014/0365693 A1 | 12/2014 | Monroe et al. | |
| 2016/0344552 A1 | 11/2016 | Sharma et al. | |
| 2017/0220502 A1* | 8/2017 | Kessler | G06F 13/4282 |
| 2017/0222829 A1* | 8/2017 | Kessler | H04L 12/40058 |
| 2018/0060269 A1* | 3/2018 | Kessler | G06F 13/4265 |
| 2018/0162295 A1 | 6/2018 | Honda et al. | |
| 2020/0169284 A1* | 5/2020 | Easwaran | B60T 7/085 |
| 2021/0036813 A1* | 2/2021 | Hartwich | H04L 1/1848 |
| 2021/0203185 A1* | 7/2021 | Bennett | H02J 13/00016 |
| 2021/0211156 A1* | 7/2021 | Kessler | H05B 47/12 |
| 2021/0226661 A1* | 7/2021 | de Haas | H04B 1/40 |
| 2021/0281497 A1* | 9/2021 | Rennig | G06F 11/0757 |
| 2021/0297282 A1* | 9/2021 | Hartwich | H04L 25/0274 |
| 2021/0389972 A1* | 12/2021 | Muth | H04L 25/4904 |

FOREIGN PATENT DOCUMENTS

| | | |
|---|---|---|
| CN | 102759891 A | 10/2012 |
| CN | 103384184 A | 11/2013 |
| CN | 109639546 A | 4/2019 |
| EP | 2940935 A1 | 11/2015 |

* cited by examiner

TRANSCEIVER UNIT AND COMMUNICATION CONTROL UNIT FOR A USER STATION OF A SERIAL BUS SYSTEM AND METHOD FOR COMMUNICATION IN A SERIAL BUS SYSTEM

FIELD

The present invention relates to a transceiver unit and a communication control unit for a user station of a serial bus system, and to a method for communication in a serial bus system, which operates at a high data rate and a high degree of error robustness.

BACKGROUND INFORMATION

For the communication between sensor and control units, for example, in vehicles, a bus system is frequently used, in which data are transmitted as messages in the Standard ISO 11898-1:2015 as CAN protocol specification with CAN FD. The messages are transmitted between the bus users of the bus system, such as sensor, control unit, generator, etc.

As the number of functions of a technical system or of a vehicle increases, so too does the data traffic in the bus system. Furthermore, the data are often required to be transmitted faster from the transmitting bus user to the receiving bus user than previously. As a result, the required bandwidth of the bus system will continue to increase.

In order to be able to transmit data at higher bit rates than in CAN, an option was created in the CAN FD messages format for switching to a higher bit rate within a message. In such technologies, the maximum possible data rate is increased by using a higher clocking in the area of the data fields beyond a value of 1 Mbit/s. Such messages are also referred to below as CAN FD frames or CAN FD messages. In CAN FD, the payload data length is expanded from 8 to up to 64 bytes and the data transmission rates are significantly higher than in CAN.

Even if a CAN-based or CAN FD-based communication network yields a large number of advantages with respect to its robustness, for example, it has a significantly lower speed as compared to a data transmission in, for example, 100 Base-T1 Ethernet. In addition, the payload data length of up to 64 bytes previously achieved with CAN FD is too short for some applications. A CAN FD successor bus system should meet at least such requirements.

SUMMARY

It is an object of the present invention to provide a transceiver unit and a communication control unit for a user station of a serial bus system and a method for communication in a serial bus system, which solves the aforementioned problems. In particular, a transceiver unit and a communication control unit for a user station of a serial bus system and a method for communication in a serial bus system, are to be provided, in which a high data rate and an increase in the amount of payload data per frame may be implemented with a high degree of error robustness.

The object may be achieved by a transceiver unit for a user station of a serial bus system in accordance with an example embodiment of the present invention. The transceiver unit has a first connection for receiving a transmit signal from a communication control unit, a transmitter for transmitting the transmit signal to a bus of the bus system, in which bus system at least one first communication phase and one second communication phase are used for the exchange of messages between user stations of the bus system, a receiver for receiving the signal from the bus, the receiver being designed to generate a digital signal from the signal received from the bus, one second connection for transmitting the digital receive signal to the communication control unit and for receiving an additional signal from the communication control unit, and an operating mode switching block for evaluating the receive signal output by the receiver and a signal received at the second connection by the communication control unit, the operating mode switching block being designed to switch the transmitter and/or the receiver into one of at least two different operating modes as a function of a result of the evaluation, and to switch at least one predetermined operating mode of the operating modes into another of the operating modes after the lapse of a time period, which is preset in the operating mode switching block for an additional internal communication between the communication control unit and the transceiver unit via the second connection.

With the transceiver unit according to an example embodiment of the present invention, it is possible, in particular, for a communication between the communication control unit and the transceiver unit to take place, in particular, during the switching between a first communication phase and a second communication phase, without the need for additional expensive connections between the communication control unit and the transceiver unit. In this case, only one communication in one direction is possible depending on the need. Alternatively, however, a communication may initially take place, for example, from the communication control unit to the transceiver unit and subsequently from the transceiver unit to the communication control unit.

In addition, an arbitration from CAN may be maintained with the transceiver unit in one of the communication phases, and still the transmission rate with respect to CAN or CAN FD may again be significantly increased. This may be achieved by using two communication phases having different bit rates and the start of the second communication phase, in which the payload data are transferred at a higher bit rate than in the arbitration, is reliably indicated for the transceiver unit. The transceiver unit may therefore be reliably switched from one first communication phase into the second communication phase. As a result, a significant increase of the bit rate and thus the transmission speed from the transmitter to the receiver is implementable. At the same time, however, a high degree of error robustness is ensured. This also contributes to the implementation of a net data rate of at least 10 Mbps. Furthermore, the size of the payload data may be greater than 64 bytes, in particular, up to 4096 bytes per frame, or may have an arbitrary length depending on the need.

The method carried out by the transceiver unit may also be used when at least one CAN user station and/or at least one CAN FD user station is/are present in the bus system, which transmit messages according to the CAN protocol and/or CAN FD protocol.

Advantageous further embodiments of the transceiver unit are disclosed herein.

The operating mode switching block is optionally designed to switch the transmitter and/or the receiver into one of at least three different operating modes as a function of a result of the evaluation, and to switch at least one predetermined operating mode of the three operating modes into another of the at least three operating modes after the lapse of a time period preset in the operating mode switching block. In this case, the at least one predetermined operating mode is the internal communication between the communication control unit and the transceiver unit implemented via the second connection.

The operating mode switching block may be designed to switch off the transmitter in the at least one predetermined operating mode.

The transmitter is potentially designed to drive bits of the signals to the bus in the first communication phase with a first bit time, which is greater by at least the factor 10 than a second bit time of bits, which the transmitter drives to the bus in the second communication phase. In this case, the signals via the first and second connection in the predetermined operating mode may have bits with a third bit time, which is smaller than the second bit time.

The aforementioned object may also achieved by a communication control unit for a user station of a serial bus system in accordance with an example embodiment of the present invention. The communication control unit has a communication control module for generating a transmit signal for controlling a communication of the user station with at least one other user station of the bus system, in which bus system at least one first communication phase and one second communication phase are used for the exchange of messages between user stations of the bus system, a first connection for transmitting the transmit signal to a transceiver unit, which is designed to transmit the transmit signal to a bus of the bus system, a second connection for receiving a digital receive signal from the transceiver unit, the communication control unit being designed to generate an additional signal, which indicates to the transceiver unit that a switch is to be made from the present operating mode into another operating mode of at least two different operating modes, and which also implements an internal communication between the communication control module and the transceiver unit for a time period presettable in the communication control module and in an operating mode switching block of the transceiver unit, and the communication control model being designed to transmit the additional signal via the second connection to the transceiver unit.

The communication control unit yields the same advantages as described above with respect to the transceiver unit.

The preset time period may be divided into a first time period, in which the operating mode switching block operates the second connection in such a way that the communication control unit is able to transmit data via the second connection, and a second time period, in which the communication control unit receives data via the second connection, the data transmitted in the preset time period being data of the type that are pieces of information in addition to the signals, which are generated in the bus system for the exchange of messages between user stations of the bus system.

It is possible that the at least one predetermined operating mode includes an operating mode in which the communication control unit is designed to transmit a clock signal via the first connection and in the timing of the clock signal to transmit data at least temporarily via the second connection and to at least temporarily receive data, and/or includes an operating mode in which the communication control unit is designed to use a Manchester coding for the exchange of data with the transceiver, and/or includes an operating mode in which the transceiver unit drives no transmit signal to the bus.

The communication control unit may be designed to transmit an identifier including a predetermined value to the receiver at the connection for the digital receive signal when transmitting a piece of protocol information at the connection for the transmit signal, which signals a switch from the at least one first communication phase into the second communication phase.

For example, the identifier is a bit including a predetermined value or pulse pattern or the identifier is a predefined bit pattern.

According to one option of the present invention, the signal received by the bus in the first communication phase is generated with a different physical layer than the signal received by bus 40 in the second communication phase.

It is possible that it is negotiated in the first communication phase which of the user stations of the bus system obtains at least a temporarily exclusive, collision-free access to the bus in the subsequent second communication phase.

The above-described transceiver unit and the above-described communication control unit may be part of a user station of a bus system, which also includes a bus and at least two user stations, which are connected to one another via the bus in such a way that they are able to communicate with one other. In this case at least one of the at least two user stations includes an above-described transceiver unit and an above-described communication control unit.

The aforementioned objective may also be achieved by a method for communication in a serial bus system in accordance with an example embodiment of the present invention. In accordance with an example embodiment of the present invention, the method is carried out with a user station for a bus system, in which at least one first communication phase and one second communication phase are used for the exchange of messages between user stations of the bus system, the user station including a transmitter, a receiver, an operating mode switching block, a first connection and a second connection, and the method including the steps: receiving, with the aid of the receiver, a signal from the bus of the bus system, generating, with the aid of the receiver, a digital receive signal from the signal received by the bus and outputting the digital receive signal at the second connection, evaluating, with the aid of the operating mode switching block, the receive signal output by the receiver and a signal received at the second connection by the communication control unit, and switching, with the aid of the operating mode switching block, the transmitter and/or the receiver into one of at least two different operating modes as a function of a result of the evaluation, and switching from at least one predetermined operating mode of the operating modes into another of the operating modes after the lapse of a time period, which is preset in the operating mode switching block for an additional internal communication between the communication control module and the transceiver via the second connection.

The method yields the same advantages as discussed above with respect to the transceiver unit and/or the communication control unit.

Further possible implementations of the present invention also include combinations of features or specific embodiments described above or below with respect to the exemplary embodiments not explicitly mentioned. In this case, those skilled in the art will also add individual aspects as improvements on or additions to the respective basic form of the present invention, in view of the disclosure herein.

BRIEF DESCRIPTION OF THE DRAWINGS

The present invention is described in greater detail below with reference to the figures and based on exemplary embodiments.

In the figures, identical or functionally identical elements are provided with the same reference numerals unless otherwise indicated.

DETAILED DESCRIPTION OF EXAMPLE EMBODIMENTS

Figure 1:
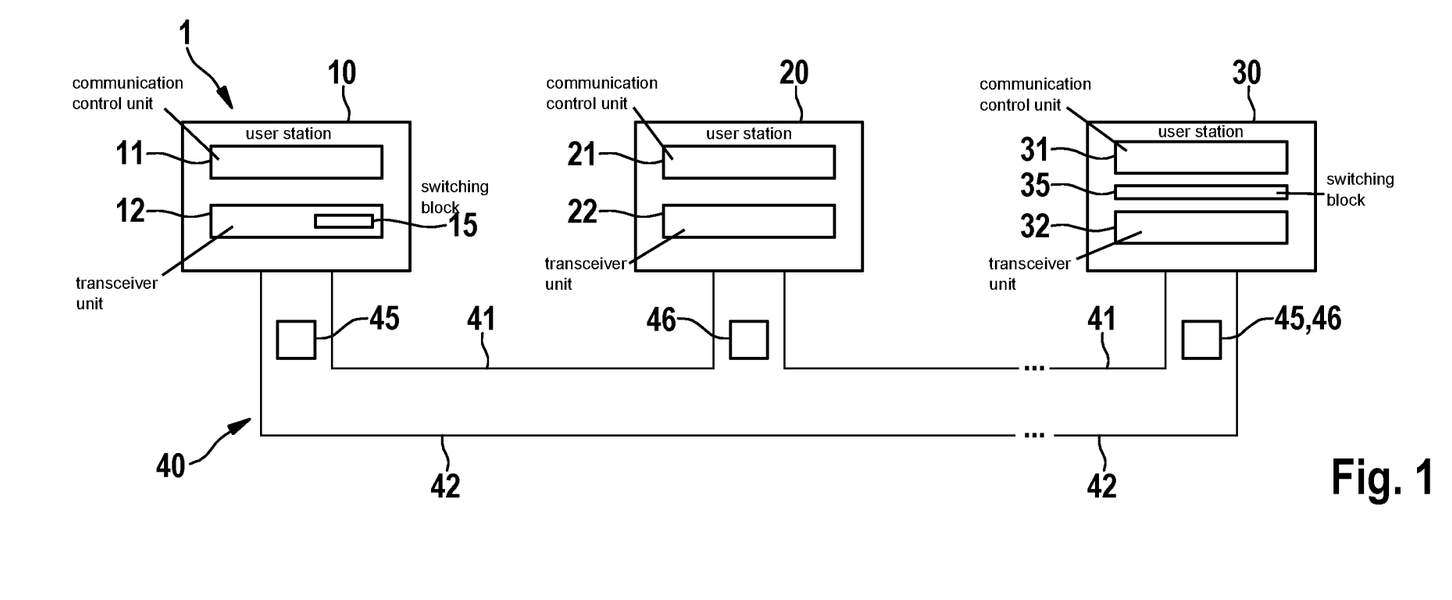
FIG. 1 shows a simplified block diagram of a bus system according to a first exemplary embodiment of the present invention.

FIG. 1 shows by way of example a bus system 1, which is designed, in particular, basically for a CAN bus system, a CAN FD bus system, a CAN FD successor bus system and/or modifications thereof, as described below. Bus system 1 may be used in a vehicle, in particular, a motor vehicle, an aircraft, etc. or in the hospital, etc.

Bus system in FIG. 1 has a plurality of user stations 10, 20, 30, each of which is connected to a bus 40 with a first bus wire 41 and a second bus wire 42. Bus wires 41, 42 may also be referred to as CAN_H and CAN_L and are used for the electrical signal transmission after coupling of the dominant level or generation of recessive levels for a signal in the transmitting state. Messages 45, 46 are serially transmittable via bus 40 in the form of signals between individual user stations 10, 20, 30. User stations 10, 20, 30 are, for example, control units, sensors, display devices, etc. of a motor vehicle.

As shown in FIG. 1, user station 10 has a communication control unit 11, a transceiver unit 12 and a switching block 15. In contrast, user station 20 has a communication control unit 21 and a transceiver unit 22. User station 30 has a communication control unit 31, a transceiver unit 32 and a switching block 35. Transceiver units 12, 22, 32 of user stations 10, 20, 30 are each directly connected to bus 40, even though this is not illustrated in FIG. 1.

In each user station 10, 20, 30, messages 45, 46 encoded in the form of frames are exchanged via a TXD line and an RXD line bit-wise between respective communication control unit 11, 21, 31 and associated transceiver units 12, 22, 32. This is described in greater detail below.

Communication control units 11, 21, 31 are each used to control a communication of respective user station 10, 20, 30 via bus 40 with at least one other user station of user stations 10, 20, 30, which are connected to bus 40.

Communication control units 11, 31 create and read first messages 45, which are modified CAN messages 45, for example, also referred to below as CAN XL messages 45. In this case, modified CAN messages 45 or CAN XL messages 45 are structured on the basis of a CAN FD successor format, which is described in greater detail with reference to FIG. 2. Communication control units 11, 31 may also be designed to provide for, or to receive from, transceiver units 12, 32, a CAN XL message 45 or a CAN FD message 46 depending on the need. Thus, communication control units 11, 31 create and read a first message 45 or second message 46, the first and second message 45, 46 differing by their data transmission standard, namely in this case CAN XL or CAN FD.

Communication control unit 21 may be designed as a conventional CAN controller according to ISO 11898-1: 2015, in particular, as a CAN FD-tolerant classical CAN controller or a CAN FD controller. Communication control unit 21 creates and reads second messages 46, for example, classical CAN FD messages or CAN FD messages 46. CAN FD messages 46 may include a number from 0 to 64 data bytes, which are transmitted at a significantly faster data rate than in the case of a classical CAN message. In the latter case, communication control unit 21 is designed as a conventional CAN FD controller.

Transceiver units 12, 32 may be designed as CAN XL transceivers except for the differences described in even greater detail below. Transceiver units 12, 32 are additionally or alternatively designable as a conventional CAN FD. Transceiver unit 22 may be designed as a conventional CAN transceiver or CAN FD transceiver.

With the two user stations 10, 30, a formation and then transmission of messages 45 using the CAN XL format as well as the reception of such messages 45 is implementable.

Figure 2:
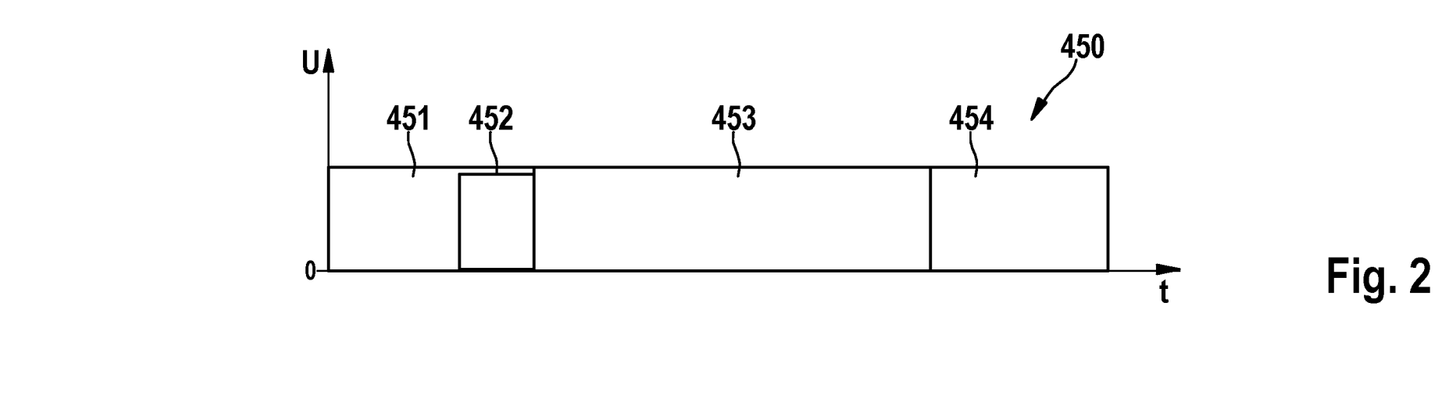
FIG. 2 shows a diagram for illustrating the structure of messages, which may be transmitted by user stations of the bus system according to the first exemplary embodiment.

FIG. 2 shows a CAN XL frame 450 for message 45, as it is transmitted by transceiver unit 12 or transceiver unit 32. CAN XL frame 450 is subdivided into different communication phases 451 through 454 for the CAN communication on bus 40, namely an arbitration phase 451, a switching phase 452, which is at the end of the arbitration phase, a data phase 453 and a frame end phase 454.

In arbitration phase 451, a bit is sent at the start, for example, which is also referred to as an SOF bit and indicates the start of frame. In arbitration phase 451, an identifier including, for example, 11 bits for identifying the transmitter of message 45 is also transmitted. During the arbitration, it is negotiated bit-wise between user stations 10, 20, 30 with the aid of the identifier which user station 10, 20, 30 wishes to transmit message 45, 46 with the highest priority, and therefore obtains an exclusive access to bus 40 of bus system 1 for the next time for transmitting in switching phase 452 and subsequent data phase 453.

The switching from arbitration phase 451 into data phase 453 is prepared in switching phase 452 in the present exemplary embodiment, one piece of protocol format information contained in at least one bit being transmitted, which is suitable for distinguishing CAN XL frames from CAN frames or CAN FD frames. In addition, a 12-bit long data length code, for example, may be transmitted, which may then adopt values, for example, from 1 up to 4096, in particular, up to 2048 or another value with the step size of 1, or alternative values from 0 to 4095 or higher. The data length code may also include fewer or more bits and the value range and the step size may adopt other values.

The payload data of CAN XL frame 450 or of message 45, which may also be referred to as data field of message 45, are transmitted in data phase 453. The payload data may include, for example, up to 4096 bytes or a greater value or other arbitrary value according to the value range of the data length code.

In frame end phase 454, a check sum of the data of data phase 453 including the stuff bits may, for example, be contained in a check sum field, which is inserted by the transmitter of message 45 as an inverse bit in each case after a predefined number of identical bits, in particular, 10 identical bits. At least one acknowledge bit may also be contained in an end field in frame end phase 454. In addition, a sequence of 11 identical bits may be present, which indicate the end of CAN XL frame 450. With the at least one acknowledge bit, it may be communicated whether or not a receiver has discovered an error in received CAN XL frame 450 or message 45.

A physical layer as in CAN and CAN FD is used at least in arbitration phase 451 and in frame end phase 454. A physical layer as in CAN and CAN FD may also be used in switching phase 452 at least partially, i.e., at the start. The physical layer corresponds to the bit transfer layer (physical layer) or layer 1 of the conventional OSI model (Open Systems Interconnection Model).

One important point during these phases 451, 452, 454 is that the conventional CSMA/CR method is used, which allows simultaneous access of user stations 10, 20, 30 on bus 40 without higher prioritized message 45, 46 being destroyed. In this way, it is possible to relatively easily add further bus-user stations 10, 20, 30 to bus system 1, which is very advantageous.

The result of the CSMA/CR method is that there must be so-called recessive states on bus 40, which may be overwritten on bus 40 by other user stations 10, 20, 30 with dominant states.

The arbitration at the start of a frame 450 or message 45, 46 and the acknowledgment in frame end phase 454 of frame 450 or message 45, 46 is possible only when the bit time is significantly more than twice as long as the signal propagation time between two arbitrary user stations 10, 20, 30 of bus system 1. The bit rate in arbitration phase 451, frame end phase 454 and at least partially in switching phase 452 is therefore selected to be slower than in data phase 453 of frame 450. The bit rate in phases 451, 452, 454 is selected, in particular, as 500 kbit/s, from which a bit time of approximately 2 µs results, whereas the bit rate in data phase 453 is selected as 5 to 10 Mbit/s or more, from which a bit time of approximately 0.1 µs or less results. Thus, the bit time of the signal in other communication phases 451, 452, 454 is greater by at least the factor 10 than the bit time of the signal in data phase 453.

A transmitter of message 45, for example, user station 10, starts a transmission of bits of switching phase 452 and of subsequent data phase 453 to bus 40 only when user station 10 has won the arbitration as the transmitter and user station 10 as transmitter thus has an exclusive access to bus 40 of bus system 1 for transmitting. The transmitter may either switch to the faster bit rate and/or to the other physical layer after a portion of switching phase 452 or may switch to the faster bit rate and/or to the other physical layer only with the first bit, i.e., with the start of subsequent data phase 453.

More generally, the following differing characteristics, in particular, may be implemented in the bus system with CAN XL as compared to CAN or CAN FD:

a) adoption and, if necessary, adaptation of proven characteristics, which are responsible for the robustness and user-friendliness of CAN and CAN FD, in particular, frame structure including identifier and arbitration according to the CSMA/CR method, b) increase of the net data transmission rate to approximately 10 megabits per second, c) increasing the size of the payload data per frame to approximately 4 kbytes or to an arbitrary value.

Figure 3:
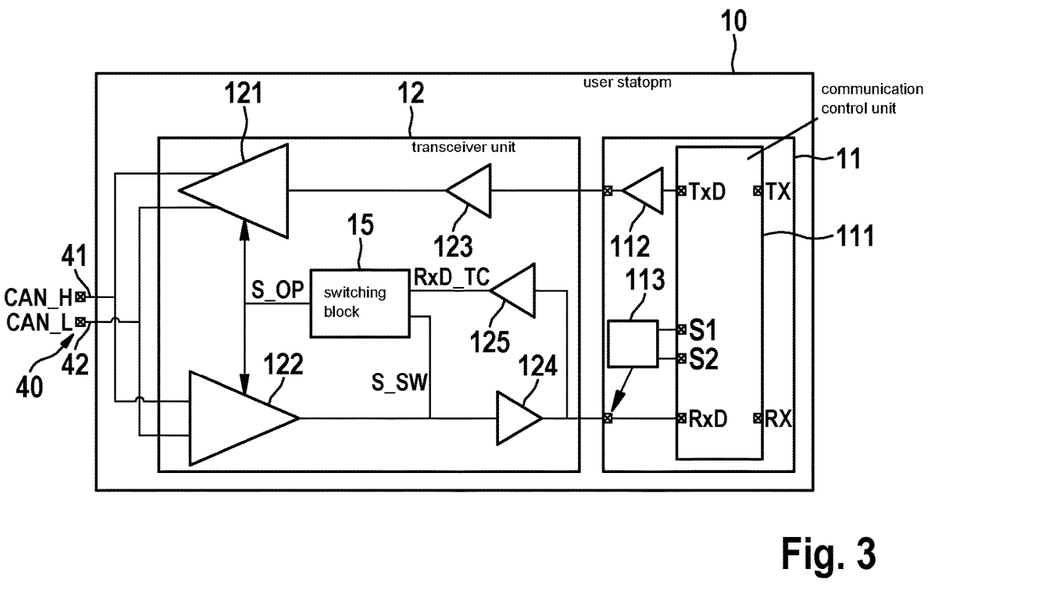
FIG. 3 shows a simplified schematic block diagram of a user station of the bus system according to the first exemplary embodiment.

FIG. 3 shows the basic structure of user station 10 including communication control unit 11, transceiver unit 12 and switching block 15. User station 30 is similarly structured as shown in FIG. 3, except that block 35 is not integrated into communication control unit 31, but is provided separately from communication control unit 31 and transceiver unit 32. Therefore, user station 30 and block 35 are not separately described. The following described functions of switching block 15 are equally present in switching block 35.

According to FIG. 3, user station 10 has, in addition to communication control unit 11, which is designed as a microcontroller or includes a microcontroller, to transceiver unit 12 and to switching block 15, communication control unit 11 also has a communication control module 111, a transmit signal output driver 112 and an RxD connection configuration module 113, which are assigned to communication control unit 11 [sic]. Communication control unit 11 processes signals of an arbitrary application, for example, of a control unit for an engine, of a safety system for a machine or a vehicle, or other applications. A system ASIC (ASIC=application-specific integrated circuit) is not shown, which may alternatively be a system basis chip (SBC), on which multiple functions required for an electronics module of user station 10 are combined. Transceiver unit 12 and a power supply unit not shown, which supplies transceiver unit 12 with electrical power, may be installed, among other things, in the system ASIC. The power supply unit usually supplies a voltage CAN_supply of 5 V. Depending on the need, the power supply unit may, however, supply another voltage having a different value and/or may be designed as a current source.

Transceiver 12 also has a transmitter 121, a receiver 122, a driver 123 for the transmit signal, a receive signal output driver 124 and a driver 125, which outputs a signal RxD_TC to switching block 15. Switching block 15 forms an operating state switching signal S_OP from signal RxD_TC and from a signal S_SW, which is the output signal of receiver 122, for switching transmitter 121 and/or receiver 122. Switching signal S_OP may, for example, contain in one bit the switching signal for transmitter 121 and receiver 122. Alternatively, switching signal S_OP may be a two-bit wide signal in order to activate transmitter 121 and receiver 122 separately by, for example, providing the first bit for switching transmitter 121 and the second bit for switching receiver 122. Arbitrary alternative design possibilities of switching signal S_OP are, of course, also possible. Transmitter 121 is also referred to as transmitter. Receiver 122 is also referred to as receiver.

Switching block 15 may be designed as a switching block, which includes, in particular, at least one flip-flop. This is described in greater detail below with reference to FIG. 4 through FIG. 8.

Even though transceiver unit 12 is always referred to below, it is alternatively possible to provide receiver 122 in a separate unit external to transmitter 121. Transmitter 121 and receiver 122 may be structured as in a conventional transceiver unit 22. Transmitter 121 may include, in particular, at least one operation amplifier and/or one transistor. Receiver 122 may include, in particular, at least one operation amplifier and/or one transistor.

Transceiver unit 12 is connected at bus 40, more precisely, at its first bus wire 41 for CAN_H and at its second bus wire 42 for CAN_L. First and second bus wire 41, 42 are connected in transceiver unit 12 to transmitter 121 and to receiver 122. The voltage supply for the power supply unit for supplying first and second bus wire 41, 42 with electrical power takes place as usual. In addition, the connection to ground or CAN_GND is implemented as usual. The same applies to the termination of first and second bus wires 41, 42 with a terminating resistor.

During the operation of bus system 1, transmitter 121 converts a transmit signal TxD of communication control unit 11 into corresponding signals CAN_H and CAN_L for bus wires 41, 42 and transmits these signals CAN_H and CAN_L to bus 40. Even if signals CAN_H and CAN_L are named here for transceiver unit 12, these are to be understood with respect to message 45 as signals CAN-XL_H and CAN-XL_L, which differ in data phase 453 from conventional signals CAN_H and CAN_L in at least one feature, in particular, with respect to the formation of bus states for the various data states of signal TxD and/or with respect to the voltage or to the physical layer and/or to the bit rate.

A differential signal VDIFF=CAN_H−CAN_L is formed on bus 40. With the exception of an idle state or standby state (idle or standby) transceiver 12 always listens with receiver 122 during normal operation for a transmission of data or messages 45, 46 on bus 40, specifically, regardless of whether or not user station 10 is the transmitter of message 45. Receiver 122 forms a receive signal RxD from signals CAN_H and CAN_L received from bus 40 and forwards this to communication control unit 11 via receive signal output driver 124, as shown in FIG. 3.

Switching block 15 is designed to recognize the start of switching phase 45 in a message 452 received from bus 40 and to then switch the characteristics of transceiver 12. A switching phase is also provided between data phase 453 and frame end phase 454, even though this is not shown in the figures. Switching block 15 also makes it possible for data D_1, D_2, for example, to be exchangeable via the connection for the RxD signal between transceiver unit 12 and communication control unit 11 or the microcontroller in a third operating mode, which is described in even greater detail with reference to FIG. 7 and FIG. 8. The data exchange is useable, in particular, in order to implement the following features:

feedback of transceiver unit 12 to communication control unit 11 or to communication control module 111 regarding the signal quality of the CAN bus communication, exchange of safety-relevant data with respect to frame 450, from which the RxD signal has been generated, configuration option of standard components such as, for example, SO8 CAN transceiver 12, feedback of transceiver unit 12 to communication control unit 11 or to communication control module 111, that the switching of communication phase 451, 453 has functioned, which is also referred to as a handshake.

The RxD connection configuration module 113 configures connection RxD depending on the required communication direction using signals S1, S2 at its input, as described below. Signal S1 may be referred to as RxD_out_ena, which enables a driving of additional signal RxD_TC via the RxD connection. Signal S2 may be referred to as RxD_out_val. Depending on the value of signal S2, communication control unit 11 drives connection RxD on the one hand at the switching points in time between the two different communication phases, i.e., on the one hand, between arbitration phase 451 and data phase 453 and, on the other hand, between data phase 453 and frame end phase 454 for signaling to transceiver unit 12. On the other hand, communication control unit 11 drives connection RxD, depending on the value of signal S2, in the above-described third operating mode, which may also be referred to as "talk mode." Otherwise, connection RxD, as usual, in particular, in the case of CAN, is an input for communication control unit 11, i.e., not an output as described above, so that communication control unit 11 does not drive connection RxD. Connection RxD may thus be driven bi-directionally with the aid of RxD connection configuration module 113 and signals S1, S2. In other words, connection RxD is a bi-directional connection.

For this purpose, communication control unit 11 and output driver 124 are designed in such a way that during driving for the purpose of signaling, communication control unit 11 drives connection RxD stronger than output driver 124. This prevents the value of the RxD line from potentially being undefined if both communication control unit 11 as well as output driver 124 drive connection RxD and a superposition of the two signal sources at connection RxD results. In such a superposition of the two signal sources at connection RxD, communication control unit 11 will therefore always prevail. As a result, the value of RxD is always defined.

Thus, switching block 15 is able to provide the possibility of setting two or more operating modes in transceiver unit 12 via the RxD connection, which form various operating states of transceiver unit 12. An additional connection at transceiver unit 12 and thus also at communication control unit 11 is therefore not required.

For this purpose, switching block 15 according to FIG. 3 is provided with two inputs, via which a signal RxD-TC and signal S_SW are fed into switching block 15. Signal RxD_TC is based on a signal that is transmitted by communication control unit 11 via the connection for the RxD signal to transceiver unit 12. With signal RxD_TC, communication control unit 11 signals transceiver unit 12 for one, that transceiver unit 12 must now carry out the switch into the operating mode for data phase 453. At the end of data phase 453, communication control unit 11 is able with signal RxD_TC to carry out the switch of transceiver unit 12 from the operating mode of data phase 453 into the operating mode for arbitration phase 451. Moreover, arbitrary other pieces of information may be transmitted with signal RxD_TC from communication control unit 11 to transceiver 12, as mentioned above.

According to FIG. 3, transceiver unit 12 directs signal RxD_TC from connection RxD via driver 125 to the connection of switching block 15 for signal RxD_TC. In contrast, signal S_SW is generated from the signal received by bus 40. Signal RxD_TC is directed between the connection for the RxD signal and the output of receive signal driver 124 to switching block 15. Signal S_SW is directed from the output of receiver 122 and before the input of receive signal driver 124 to switching block 15.

Figure 4:
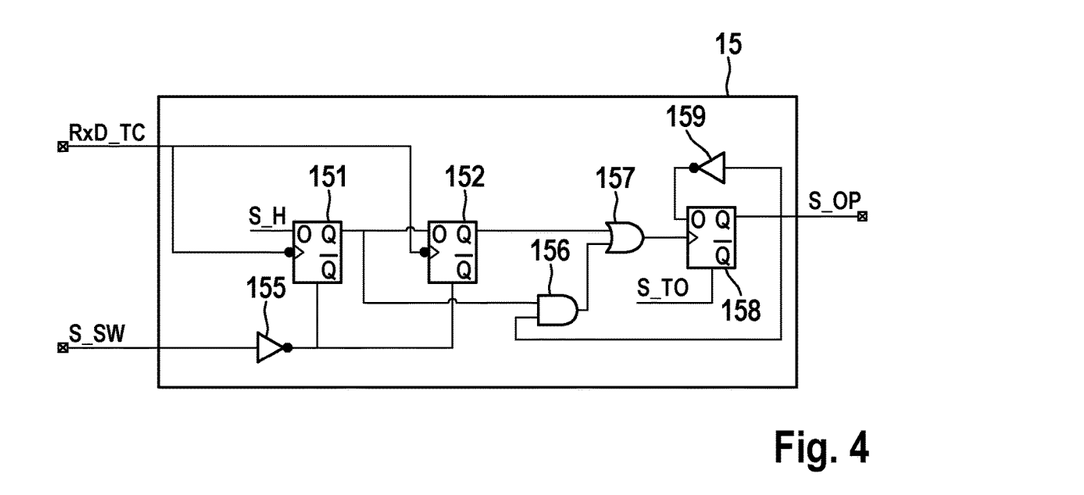
FIG. 4 shows an electrical diagram of an operating mode switching block for switching the operating mode of a transceiver unit of the user station of FIG. 3, in accordance with an example embodiment of the present invention.

According to one specific example, which is shown in FIG. 4, switching block 15 has two D flip-flops 151, 152, into which signal RxD_TC is input as a clock signal. The two D flip-flops 151, 152 respond to falling clock edges of the clock signal, i.e. of signal RxD_TC. A High state or a first binary signal state is also present with signal S_H at the input of D flip-flop 151. In addition, inverted signal S_SW is input as a reset into D flip-flops 151, 152. Before the input, signal S_SW is directed into D flip-flops 151, 152 via an inverter 155. D flip-flops 151, 152 are interconnected with logic gates 156, 157, namely, an AND gate 156 and an OR gate 157. The output of OR gate 157 is fed as a clock signal to a D flip-flop 158, into which a time out signal S_TO is also fed as a reset, which indicates the lapse of a predetermined time period T0. Signal S_TO becomes active when a predetermined time period, for example, 11 bit times long, no edges are observed on bus 40 [sic]. D flip-flop 158 responds to rising clock edges. In addition, an inverter 159 is connected between D flip-flop 158 and an input of AND gate 156. In the specific example of FIG. 4, third D flip-flop 158 is switched as a result of two falling edges of the RxD_TC signal from 0 to 1 while signal S_SW is High. When flip-flop 158 is on 1, it is switched as a result of a falling edge of the RxD_TC signal from 1 to 0 while signal S_SW is High. When signal S_SW is Low, the two D flip-flops 151, 152 are reset and do not respond to falling edges of signal RxD_TC.

The above-described switching conditions may, of course be differently established, for example, rising edges on signal RxD_TC while signal S_SW is Low. Other levels and/or other numbers of edges are also possible, with other circuits in switching block 15.

In the specific example of FIG. 4, D flip-flop 158 drives binary operating state switching signal S_OP. If switching signal S_OP is to be two bits wide, or if more than two operating states are to be represented, additional D flip-flops including other switching conditions are required, as described above.

If switching block 15 recognizes switching phase 452, the operating state of transmitter 121 and/or of receiver 122, and thus the operating mode of transceiver 12 is switched with signal S_OP output from switching block 15. This is explained in greater detail with reference to FIG. 5 and FIG. 6.

Figure 5:
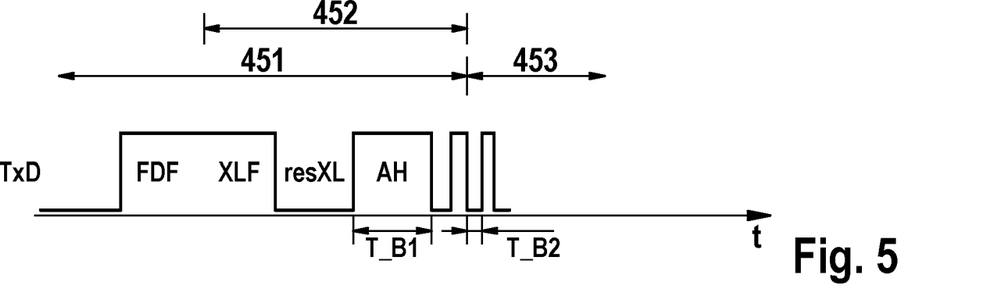
FIG. 5 shows a temporal profile of a part of a transmit signal TxD transmitted by the user station of FIG. 3 according to the first exemplary embodiment, in which a switch is made from the arbitration phase as first operating mode of the transceiver unit into the data phase as second operating mode of the transceiver unit.

According to FIG. 5, communication control unit 11 transmits in succession in the switching phase 452 in transmit signal TxD an FDF bit and an XLF bit, each with the state High (first binary signal state). This is followed by a resXL bit, which is transmitted with the state Low (second binary signal state), and is followed by an AH bit, which is transmitted with the state High (first binary signal state). Subsequently, a switch is made at the end of arbitration phase 451 from the bits of arbitration phase 451 with bit time T_B1 to the shorter bits of data phase 453 with bit time T_B2, as shown in FIG. 5.

Figure 6:
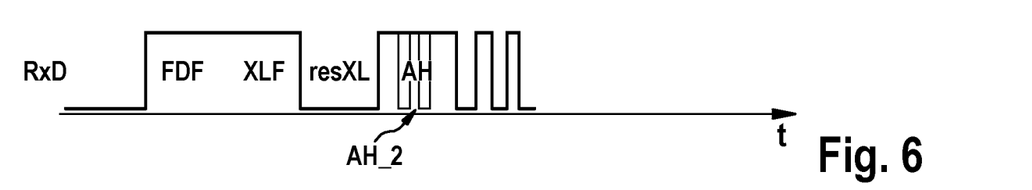
FIG. 6 shows a temporal profile of a receive signal RxD, which results from the transmit signal TxD of FIG. 5 in the user station of FIG. 3.

According to FIG. 6, however, transceiver unit 12 sees a receive signal RxD which, in the AH bit in deviation from the profile of the TxD signal described above in FIG. 5, includes two Low pulses AH_2. In other words, communication control unit 11 transmits a signal RxD_TC via the RxD connection, in which an identifier in the form of two pulses AH_2 with the second binary signal state is transmitted in the AH bit. In this way, transceiver unit 12 is signaled that a switch is to be made from its first operating mode into its second operating mode in order to generate bus signal CAN_H, CAN_L from the following bits of transmit signal TxD.

The signaling may thus take place in such a way that a sequence of two Low pulses AH_2 indicates the transition from arbitration phase 451 (first operating mode) into data phase 452 (second operating mode), as shown in FIG. 6. The transmission of data of the data field of a frame 450 may subsequently be carried out. By contrast, a single pulse may effectuate the transition from data phase 452 into arbitration phase 451, i.e., from the second operating mode of transceiver unit 12 into its first operating mode. The single pulse may be transmitted in signal RxD_TC at an arbitrary point in bit AH. Only one of pulses AH_2 of FIG. 6, in particular, may be transmitted as a single pulse. Alternatively, a single pulse or an individual pulse, in particular, is transmitted in the middle of bit AH.

In the transition of the operating mode of transceiver unit 12 to the operating mode of arbitration phase 451 (first operating mode), transmitter 121 and receiver 122 switch immediately. In the transition of the operating mode of transceiver unit 12 to the operating mode of data phase 453 (second operating mode) receiver 122 switches immediately and transmitter 121 switches when transmit signal TxD switches to Low (second signal state). Other switching conditions are, of course, equally possible.

Figure 7:
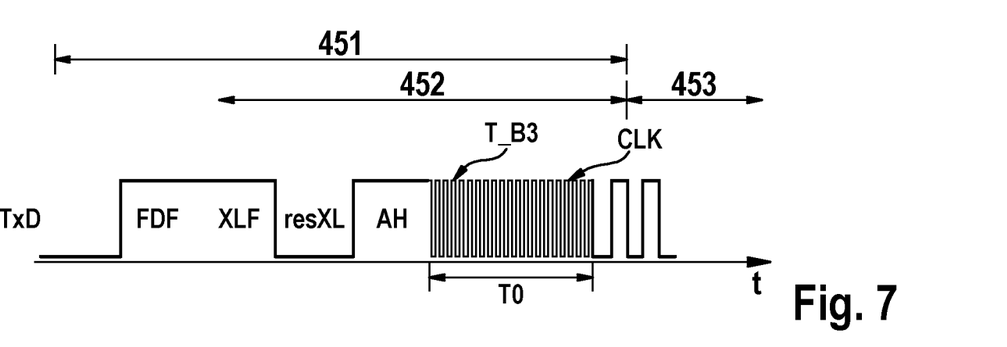
FIG. 7 shows a temporal profile of a part of a transmit signal TxD transmitted by the user station of FIG. 3 according to the first exemplary embodiment, in which a switch is made from the arbitration phase as first operating mode of the transceiver unit into a third operating mode of the transceiver unit.
Figure 8:
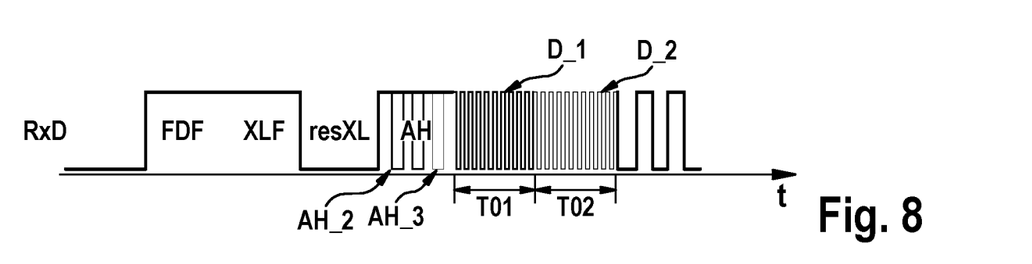
FIG. 8 shows a temporal profile of a receive signal RxD, which results from transmit signal TxD of FIG. 7 in the user station of FIG. 3.

FIG. 7 and FIG. 8 show a transmit signal TxD and a receive signal RxD, which appear at transceiver unit 12 when switching into a third operating mode. The third operating mode may also be referred to as "Talk Mode." In the third operating mode, data D_1, D_2 may be exchanged between transceiver unit 12 and the microcontroller or communication control unit 11, so that an internal communication takes place between units 11, 12. "Internal communication" here means that data D_1, D_2 are not transmitted to bus 40. The microcontroller or communication control unit 11 thus has the option in the third operating mode of driving its/their RxD connection as an output. Data D_1 may contain other pieces of information from communication control unit 11 for transceiver 12, as mentioned above. Data D_2 may contain other pieces of information from communication control unit 11 for transceiver 12, as mentioned above.

For the switch into the third operating mode, communication control unit 11 transmits a third Low pulse AH_3 in signal RxD_TC to transceiver unit 12. In this way, communication control unit 11 switches transceiver unit 12 for a predetermined time period T0 into its third operating mode with the aid of module 111. In the third operating mode, output driver or transmitter 121 is switched off at transceiver unit 12, so that the communication between communication control unit 11 and transceiver unit 12 does not disrupt bus 40. After the lapse of predetermined time period T0, which is predefined by a fixed number of clock signal edges, transceiver unit 12 is switched from its third operating mode into its above-described second operating mode, as illustrated in FIG. 7 and FIG. 8. This starts the transmission of the data of the data field (data phase 453).

According to the example of FIG. 7 and FIG. 8, communication control unit 11 transmits with the aid of the TxD connection a clock signal CLK with a bit time T_B3 to transceiver unit 12 in the third operating mode of transceiver unit 12. Bit time T_B3 is smaller or shorter than bit time T_B2. Bit time T_B3 is smaller or shorter than bit time T_B1. This is possible if bit rate T_B2 of data phase 453 is not configured to the maximum of transceiver unit 12. The reason for this could be that the cable tree of bus 40 does not allow the high bit rate, which results in a bit time T_B3. The bits in the third operating mode may, however, not be shorter if connections RxD and TxD as well as the signal paths are designed for maximal bit rate T_B2 of data phase 453. During the first x clocks of clock signal CLK, which are transmitted during a time period T01, the RxD line or connection RxD of transceiver unit 12 is operated in the one direction. For the remaining y clocks, which are transmitted during a time period T02, the RxD line or connection RxD of transceiver unit 12 is operated in the other direction. Thus, for example, initially communication control unit 11 may transmit data D_1 to transceiver unit 12 and then transceiver unit 12 may transmit data D_2 to communication control unit 11, as illustrated in FIG. 8.

The predetermined time period T0 is made up of the sum of x and y clocks of clock signal CLK. Thus T0=T01+T02 is applicable. The numerical values for x or T01 and y or T02 may be the same or different. The numerical values for x and y are settable specific to the application. Alternatively, the numerical values for time periods T01, T02 are settable specific to the application. Alternatively, the order of the communication directions may be differently selected. Accordingly, data D_2 may alternatively be initially transmitted and only then data D_1 in time period T01.

The described data exchange is operated at a clock rate, which fits the bit time requirement of later data phase 453, in particular, at bit time T_B2 for a data rate of approximately 10 Mbit/s. The clock rate at connection TxD and connection RxD of units 11, 12 and thus the clock rate of clock signal CLK, is thus at 10 MHz in the cited example. In principle, however, the clock rate may be set specific to the application.

As mentioned above, clock signal CLK is transmitted by communication control unit 11 on TxD line. Communication control unit 11 has a sufficiently accurate clock reference. During time period T01, transceiver unit 12 receives data D_1 at connection RxD synchronously with clock signal CLK. During time period T02, transceiver unit 12 transmits data D_2 at connection RxD synchronously with clock signal CLK. Alternatively, the RxD connection may transmit clock signal CLK and the TxD connection may transmit data D_1.

As a result thereof, no galvanic connection resulting from, in each case, one additional connection at communication control unit 11 and transceiver unit 12 connected thereto is required, so that communication control unit 11 is able to transmit the point in time of the bit rates switch or other data D_1, D_2 to transceiver unit 12. This means, block 15 advantageously requires no additional connection, which is not available at a standard housing of transceiver unit 12. Thus, no switch to another larger and cost-intensive housing is required by block 15 in order to provide an additional connection.

In addition, operating mode switching block 15 ensures that no integration of a protocol controller functionality in transceiver unit 12 is required. Such a protocol controller could, among other things, recognize switching phase 452 of message 45 and initiate data phase 453 as a function thereof. Since, however, such an additional protocol controller would require considerable space in transceiver unit 12 or in the ASIC, operating mode switching block 15 brings about a significant reduction of the resource requirements.

As a result, the interconnection of operating mode switching block 15 with a conventional transceiver provides a very uncomplicated and cost-efficient solution in order to indicate to transceiver unit 12 that a switch and which switch between its various operating modes is to be carried out, namely, in particular, from the first operating mode into the second operating mode or from the first operating mode into the third operating mode or from the second operating mode into the first operating mode or any other switch of operating modes.

As a result of the described design of transceiver unit(s) 12, 32, it is possible to achieve far higher data rates in data phase 452 than with CAN or CAN FD. Moreover, the data length in the data field of data phase 453 may be arbitrarily selected, as described above. As a result, the advantages of CAN with respect to the arbitration may be maintained and a larger number of data may still be very safely and thus effectively transmitted in a shorter period of time than previously, i.e., without the need to repeat the data due to an error, as explained below.

One further advantage is that error frames in bus system 1 are not required in the transmission of message 45, but may optionally be used. If no error frames are used, messages 45 are no longer destroyed, which eliminates a cause for the necessity of a double transmission of messages. This increases the net data rate.

If the bus system is not a CAN bus system, operating mode switching block 15, 35 may be designed or is to be designed to respond to other switching signals. In this case, operating mode switching block 15, 35 may switch transmitter 121 and/or receiver 122 into one of at least two different operating modes as a function of a result of its evaluation, and may switch at least one of the operating modes into another of the operating modes after the lapse of a time period T0 preset in operating mode switching block 15, 35.

Figure 9:
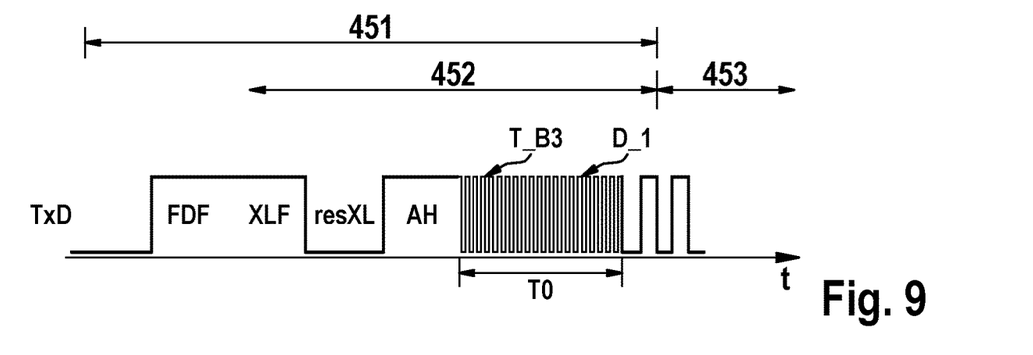
FIG. 9 shows a temporal profile of a part of a transmit signal TxD transmitted by a user station of the bus system according to a second exemplary embodiment of the present invention, in which a switch is made from the arbitration phase as first operating mode of the transceiver unit into a third operating mode of the transceiver unit.
Figure 10:
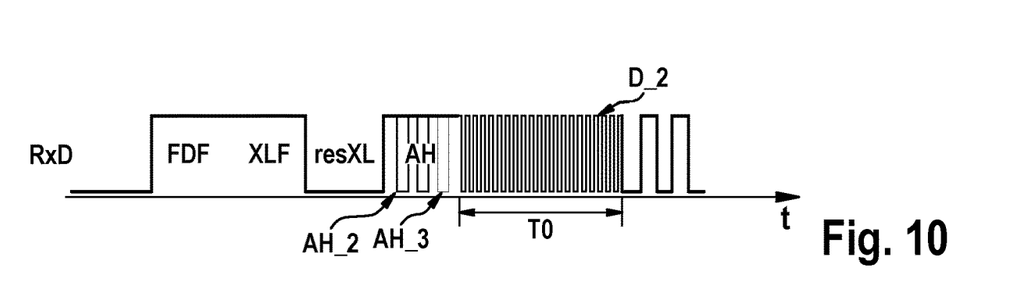
FIG. 10 shows a temporal profile of a receive signal RxD, which results from transmit signal TxD of FIG. 9 in the user station of the bus system.

FIG. 9 and FIG. 10 show signal curves of the TxD signal and of the RxD signal in a second exemplary embodiment at the transition between arbitration phase 451 and data phase 453.

According to the example of FIG. 9 and FIG. 10, a Manchester coding is used on the TxD line as well as on the RxD line. In this case, data D_1 may be transmitted at connection TxD to transceiver 12. By contrast, data D_2 are transmitted at connection RxD to the microcontroller or to communication control unit 11. Alternatively, the two data directions may be reversed.

Transceiver unit 12 uses the principle of clock recovery for decoding data D_1 at connection TxD of transceiver unit 12. Clock CLK obtained in this way is used simultaneously as a transmit clocking for data D_2 transmitted at connection RxD.

Bus system 1 in the second exemplary embodiment is otherwise structured in the same way as described above with respect to the first exemplary embodiment.

Figure 11:
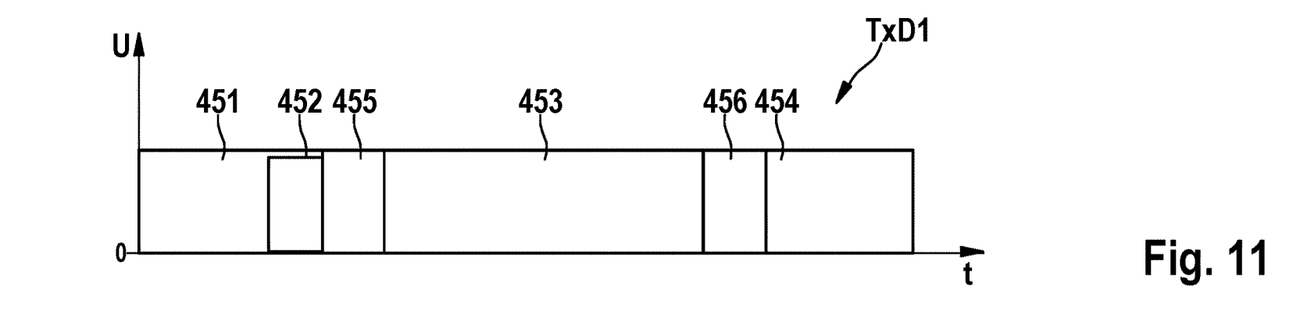
FIGS. 11 through 13 each show a diagram for illustrating the structure of messages, which may be exchanged between the transceiver unit and the communication control unit of the bus system according to a third through fifth exemplary embodiment in specific communication sequences in the bus system, in accordance with the present invention.

FIG. 11 shows in a simplified manner a transmit signal TxD1 for a message 45, as it is received from transceiver unit 12 or from transceiver unit 32 according to a third exemplary embodiment by associated communication control unit 11, 31. Transmit signal TxD1 is subdivided for the CAN communication on bus 40 into different communication phases 451 through 456, namely, arbitration phase 451, switching phase 452, which is at the end of arbitration phase 451, data phase 453 and frame end phase 454, as well as a first internal communication phase 455 and a second internal communication phase 456. The resulting receive signal at connection RxD is similarly structured.

First internal communication phase 455 is situated between switching phase 452 and data phase 453. Second internal communication phase 456 is situated between data phase 453 and frame end phase 454. First internal communication phase 455 may be utilized for the transmission of data D_1 for controlling transceiver unit 12 or transceiver unit 32 by associated communication control unit 11, 31. Second internal communication phase 456 may be utilized for the transmission of data D_2 for a feedback of transceiver unit 12 or transceiver unit 32 to associated communication unit 11, 31.

The communication in user stations 10, 30 and in bus system 1 may otherwise take place as described with reference to the first or second exemplary embodiment.

Figure 12:
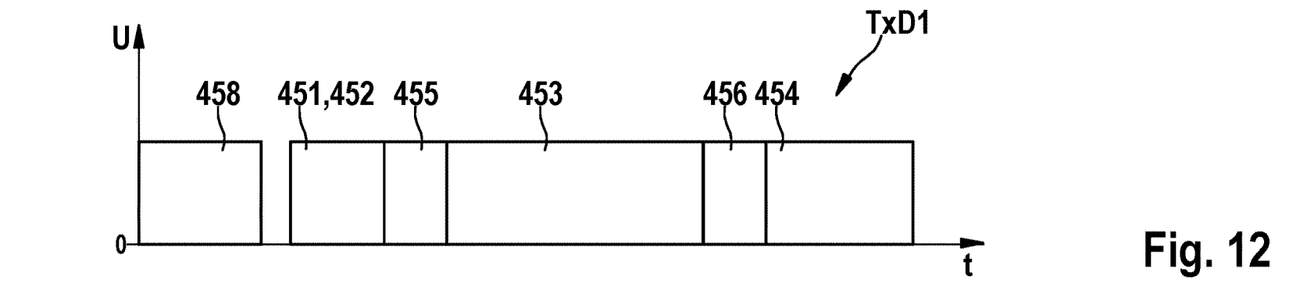

FIG. 12 shows in a simplified manner transmit signal TxD1 for a message 45, as it is received from transceiver unit 12 or from transceiver unit 32 according to a fourth exemplary embodiment by associated communication control unit 11, 31. Transmit signal TxD1 is structured as described above with reference to FIG. 11. Furthermore, transmit signal TxD1 is preceded by a configuration phase 458, which may be temporally longer than the temporal length of phases 455, 456 combined.

No CAN (XL) messages 45 are able to be transmitted while transceiver unit 12 or transceiver unit 32 is in configuration phase 458 or in the configuration operating mode. Transceiver unit 12 or transceiver unit 32 are therefore switched into the configuration operating mode only if it is possible to forego the communication via bus 40. Such a time is present, for example, in the initializing phase after bus system 1 is switched on, before the communication on bus 40 is started.

Configuration phase 458 and thus the configuration operating mode may last for an arbitrary length of time and may transmit an arbitrary number of data D_1, D_2. For example, the settings required for selective wake-up functions according to ISO 11898-6 may additionally or alternatively be transmitted as data D_1, D_2. Pieces of status information and error codes may additionally or alternatively be read out from respective transceiver units 12, 32.

The switch into configuration phase 458 and thus the configuration operating mode takes place in a similar manner to the other switches, for example, by two '0' pulses or Low pulses driven by communication control unit 11 or its module 111, whereas the transceiver outputs the '1' level or High level, as described above in greater detail with reference to FIG. 5 through FIG. 10.

In this way, the time for the internal data exchange or the internal communication in at least one of user stations 10, 30 may be extended without decreasing the payload data rate of the CAN XL communication. This is an advantage as compared to the preceding exemplary embodiments, in which only a few bits are transmitted in the internal communication in user stations 10, 30 in phases 455, 456.

The communication in user stations 10, 30, and in bus system 1 otherwise takes place as described with reference to the first or second exemplary embodiment.

Figure 13:
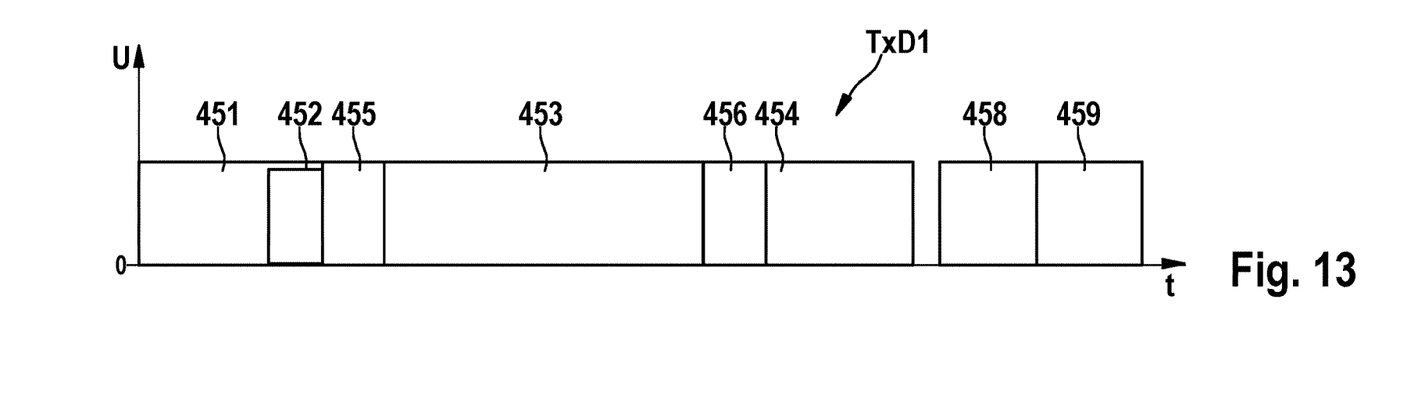

FIG. 13 shows in a simplified manner transmit signal TxD1 for a message 45, as it is received from transceiver unit 12 or from transceiver unit 32 according to a fifth exemplary embodiment by associated communication control unit 11, 31. Transmit signal TxD1 is structured as described above with reference to FIG. 11. In contrast to the example of FIG. 12, transmit signal TxD1 is followed during operation of bus system 1 by an idle phase 459, which may be temporally longer than the temporal length of phases 455, 456 combined.

In idle phase 459, bus 40 is in the idle state, in which no CAN (XL) messages 45 are transmitted via bus 40. Therefore, the configuration operating mode may also be switched on in idle phase 459, in particular, in a phase 458 or phase 459. In this case, communication control unit 11 or its communication control module 111 must be reintegrated again into the communication on bus 40 or wait for next idle phase 459 of bus 40 after the end of the configuration operating mode.

Thus, here too, as in the example of FIG. 12, the configuration operating mode may last for an arbitrary length of time, so that an arbitrary number of data D_1 D_2 may be transmitted. The maximum time period for the configuration operating mode during an idle phase 459 of bus 40 at units 11, 12 or 31, 32 is optionally adjustable.

Otherwise, the same applies as described above for the communication in user stations 10, 30 and in bus system 1 with respect to the preceding exemplary embodiment.

According to a sixth exemplary embodiment, operating mode switching block 15 is structured to use more than three pulses or a predetermined pulse pattern as an identifier. Such a pulse pattern could, for example, be a sequence of two Low pulses, two High states with the duration of a Low pulse and a subsequent Low pulse. Other pulse patterns are, of course, also usable. In the cited embodiments, switching block 15 may set in each case more than three operating modes for transceiver unit 12, which differ from one another in at least one feature.

According to a first example of the embodiment of more than three operating modes, a transmission of data D_1, D_2 may take place in a third operating mode, as described with respect to the first exemplary embodiment. In a fourth operating mode, a transmission of data D_1, D_2 may take place as described with respect to the second exemplary embodiment.

According to a second example of the embodiment of more than three operating modes, a transmission of only data D_1 may take place in a third operating mode, as described with reference to the first or second exemplary embodiment. Subsequently, a switch may be made to the above-described second operating mode. After a predetermined time period or in a particular event, the transmission of the data field may be interrupted by switching into a fourth operating mode, in order to carry out a transmission of data D_1 and/or D_2, as described with reference to the first or second exemplary embodiment.

Other examples of the embodiment of more than three operating modes are, of course, also possible.

In all variants, the described options are, of course, definable or configurable specific to the application as an arbitrary number of operating modes.

Bus system 1 in the sixth exemplary embodiment is otherwise structured in the same way as described above with reference to one of the preceding exemplary embodiments.

All above-described embodiments of blocks 15, 35, of user stations 10, 20, 30, of bus system 1 and of the method carried out therein may be used individually or in all possible combinations. All features of the above-described exemplary embodiments and/or their modifications, in particular, may be arbitrarily combined. In addition or alternatively, the following modifications, in particular, are possible.

Even if the present invention is described above by way of example of the CAN bus system, the present invention may be used in any communication network and/or communication method, in which two different communication phases are used, in which the bus states generated for the different communication phases differ from one another. The present invention is usable, in particular, in developments of other serial communication networks, such as Ethernet and/or 100 Base-T1 Ethernet, field bus systems, etc.

The above-described bus system 1 according to the exemplary embodiments is described with reference to a bus system based on the CAN protocol. Bus system 1 according to the exemplary embodiments may, however, also be another type of communication network, in which data are serially transmittable at two different bit rates. It is advantageous, but not a necessary requirement, that in bus system 1 an exclusive, collision-free access of a user station 10, 20, 30 to a shared channel is ensured, at least for particular time spans.

The number and arrangement of user stations 10, 20, 30 in bus system 1 of the exemplary embodiments is arbitrary. User station 20 in bus system 1 may, in particular, be omitted. It is possible that one or multiple of user stations 10 or 30 are present in bus system 1. It is possible that all user stations in bus system 1 are identically designed, i.e., only user station 10 or only user 30 is present.

What is claimed is:

1. A transceiver unit for a user station of a serial bus system, comprising:
   a first connection configured to receive a transmit signal from a communication control unit,
   a transmitter configured to transmit the transmit signal to a bus of the bus system, in which bus system at least one first communication phase and one second communication phase are used for an exchange of messages between user stations of the bus system;
   a receiver configured to receive a signal from the bus, the receiver being configured to generate a digital receive signal from the signal received from the bus;
   a second connection configured to transmit the digital receive signal to the communication control unit and to receive an additional signal from the communication control unit; and
   an operating mode switching block configured to evaluate the digital receive signal output by the receiver and a signal received at the second connection from the communication control unit, the operating mode switching block being configured to switch the transmitter and/or the receiver into one of at least two different operating modes as a function of a result of the evaluation, and to switch at least one predetermined operating mode of the operating modes into another of the operating modes after a lapse of a time period, which is pre-settable in the operating mode switching block for an additional internal communication between the communication control unit and the transceiver unit via the second connection.

2. The transceiver unit as recited in claim 1, wherein the operating mode switching block is configured to switch the transmitter and/or the receiver into one of at least three different operating modes as a function of a result of the evaluation, and to switch at least one predetermined operating mode of the three operating modes into another of the at least three operating modes after the lapse of the time period preset in the operating mode switching block, and wherein the at least one predetermined operating mode implements the internal communication between the communication control unit and the transceiver unit via the second connection.

3. The transceiver unit as recited in claim 1, wherein the operating mode switching block is configured to switch off the transmitter in the at least one predetermined operating mode.

4. The transceiver unit as recited in claim 1, wherein the transmitter is configured to drive bits of signals in the first communication phase to the bus with a first bit time, which is greater by at least the factor 10 than a second bit time of bits, which the transmitter drives to the bus in the second communication phase.

5. The transceiver unit as recited in claim 4, wherein signals via the first and second connection in the predetermined operating mode have bits with a third bit time, which is smaller than the second bit time.

6. A communication control unit for a user station of a serial bus system, comprising:
   a communication control module configured to generate a transmit signal for controlling a communication of the user station with at least one other user station of the bus system, in which bus system at least one first communication phase and one second communication phase are used for an exchange of messages between user stations of the bus system;
   a first connection configured to transmit the transmit signal to a transceiver unit which is configured for transmitting the transmit signal to a bus of the bus system;
   a second connection configured to receive a digital receive signal from the transceiver unit;
   wherein the communication control unit is configured to generate an additional signal which indicates to the transceiver unit that a switch is to be made from a present operating mode into another operating mode of at least two different operating modes, and which also implements an internal communication between the communication control module and the transceiver unit for a time period pre-settable in the communication control module and in an operating mode switching block of the transceiver unit, and wherein the communication control module is configured to transmit the additional signal via the second connection to the transceiver unit.

7. The communication control unit as recited in claim 6, wherein the preset time period is divided into a first time period, in which the operating mode switching block operates the second connection in such a way that the communication control unit is able to transmit data via the second connection, and a second time period, in which the communication control unit receives data via the second connection, and data transmitted in the preset time period being data which are additional pieces of information to signals which are generated in the bus system for the exchange of messages between user stations of the bus system.

8. The communication control unit as recited in claim 6, wherein the at least one predetermined operating mode includes:
   an operating mode in which the communication control unit is configured to transmit a clock signal via the first connection and in a timing of the clock signal to transmit data at least temporarily via the second connection and to at least temporarily receive data, and/or
   an operating mode in which the communication control unit is configured to use a Manchester coding for data for an exchange of data with the transceiver unit, and/or an operating mode in which the transceiver unit drives no transmit signal to the bus.

9. The communication control unit as recited in claim 8, wherein the communication control unit is configured to transmit an identifier including a predetermined value to the transceiver at the second connection for the digital receive signal when transmitting a piece of protocol information at the first connection for the transmit signal, which signals a switch from the at least one first communication phase into the second communication phase.

10. The communication control unit as recited in claim 9, wherein the identifier is a bit including a predetermined value or pulse pattern.

11. The communication control unit as recited in claim 9, wherein the identifier is a predetermined bit pattern.

12. The communication control unit as recited in claim 6, wherein a signal received by the bus in the first communication phase is generated with a different physical layer than a signal received by the bus (in the second communication phase.

13. The communication control unit as recited in claim 6, wherein it is negotiated in the first communication phase which of the user stations of the bus system receives an at least temporarily exclusive, collision-free access to the bus in a subsequent, second communication phase.

14. A bus system, comprising:
a bus; and
at least two user stations which are connected to one another via the bus in such a way that they are able to serially communicate with one another, wherein at least one of the user stations includes:
  a transceiver unit for a user station of a serial bus system, including:
    a first connection configured to receive a transmit signal from a communication control unit,
    a transmitter configured to transmit the transmit signal to a bus of the bus system, in which bus system at least one first communication phase and one second communication phase are used for an exchange of messages between user stations of the bus system,
    a receiver configured to receive a signal from the bus, the receiver being configured to generate a digital receive signal from the signal received from the bus,
    a second connection configured to transmit the digital receive signal to the communication control unit and to receive an additional signal from the communication control unit, and
    an operating mode switching block configured to evaluate the digital receive signal output by the receiver and a signal received at the second connection from the communication control unit, the operating mode switching block being configured to switch the transmitter and/or the receiver into one of at least two different operating modes as a function of a result of the evaluation, and to switch at least one predetermined operating mode of the operating modes into another of the operating modes after a lapse of a time period, which is pre-settable in the operating mode switching block for an additional internal communication between the communication control unit and the transceiver unit via the second connection; and
  the communication control unit for a user station of a serial bus system, including:
    a communication control module configured to generate the transmit signal for controlling a communication of the user station with at least one other user station of the bus system,
    wherein the communication control unit is configured to generate the additional signal which indicates to the transceiver unit that a switch is to be made from a present operating mode into another operating mode of the at least two different operating modes, and which also implements an internal communication between the communication control module and the transceiver unit for the time period pre-settable in the communication control module and in the operating mode switching block of the transceiver unit, and wherein the communication control module is configured to transmit the additional signal via the second connection to the transceiver unit.

15. A method for communication in a serial bus system, the method being carried out with a user station for a bus system in which bus system at least one first communication phase and one second communication phase are used for the exchange of messages between user stations of the bus system, the user station including a transmitter, a receiver, an operating mode switching block, a first connection, and a second connection, and the method comprising the following steps:
  receiving, using the receiver, a signal from the bus of the bus system;
  generating, using the receiver, a digital receive signal from the signal received from the bus, and outputting the digital receive signal at the second connection;
  evaluating, using the operating mode switching block, the digital receive signal output by the receiver and a signal received at the second connection from the communication control unit; and
  switching, using the operating mode switching block, the transmitter and/or the receiver into one of at least two different operating modes as a function of a result of the evaluation, and switching from at least one predetermined operating mode of the operating modes into another of the operating modes after a lapse of a time period, which is preset in the operating mode switching block for an additional internal communication between the communication control module and the transceiver unit via the second connection.

\* \* \* \* \*